United States Patent
Ichinose et al.

(10) Patent No.: US 8,763,430 B2
(45) Date of Patent: Jul. 1, 2014

(54) METHOD FOR MANUFACTURING GRIN LENS

(75) Inventors: Tomomi Ichinose, Kanagawa (JP); Toru Achiwa, Kanagawa (JP)

(73) Assignee: Toyo Seikan Group Holdings, Ltd., Tokyo (JP)

( * ) Notice: Subject to any disclaimer, the term of this patent is extended or adjusted under 35 U.S.C. 154(b) by 301 days.

(21) Appl. No.: 13/001,920

(22) PCT Filed: Jun. 30, 2008

(86) PCT No.: PCT/JP2008/061833
§ 371 (c)(1),
(2), (4) Date: Dec. 29, 2010

(87) PCT Pub. No.: WO2010/001449
PCT Pub. Date: Jan. 7, 2010

(65) Prior Publication Data
US 2011/0107794 A1      May 12, 2011

(51) Int. Cl.
C03B 37/016    (2006.01)
C03B 37/027    (2006.01)
C03B 19/12     (2006.01)
C03C 1/00      (2006.01)

(52) U.S. Cl.
CPC .............. C03B 37/016 (2013.01); C03B 19/12 (2013.01); C03C 2203/26 (2013.01); C03C 1/006 (2013.01); C03C 2201/40 (2013.01); C03C 2201/42 (2013.01); C03B 37/027 (2013.01); C03B 2203/26 (2013.01)
USPC ......... 65/395; 65/390; 65/440; 65/31; 501/12

(58) Field of Classification Search
None
See application file for complete search history.

(56) References Cited

U.S. PATENT DOCUMENTS

| | | | | |
|---|---|---|---|---|
| 5,068,208 A | * | 11/1991 | Haun et al. | 501/12 |
| 5,069,700 A | | 12/1991 | Yamane et al. | |
| 5,182,236 A | | 1/1993 | Caldwell et al. | |
| 7,891,214 B2 | * | 2/2011 | Ichinose et al. | 65/385 |
| 2002/0146202 A1 | * | 10/2002 | Reed et al. | 385/34 |
| 2006/0045419 A1 | | 3/2006 | Matsumura et al. | |
| 2007/0160854 A1 | | 7/2007 | Matsumura et al. | |
| 2009/0235696 A1 | | 9/2009 | Ichinose et al. | |

FOREIGN PATENT DOCUMENTS

| | | |
|---|---|---|
| JP | 3-295818 | 12/1991 |
| JP | 5-306125 | 11/1993 |
| JP | 5-306126 | 11/1993 |

(Continued)

OTHER PUBLICATIONS

Schott Technical Information, "TIE-30: Chemical properties of optical glass", pp. 1-10, Mar. 2008.*

(Continued)

*Primary Examiner* — Matthew Daniels
*Assistant Examiner* — Lisa Herring
(74) *Attorney, Agent, or Firm* — Wenderoth, Lind & Ponack, L.L.P.

(57) ABSTRACT

[Object] In manufacturing a GRIN lens by a sol-gel method, an operation for preparing a wet gel is facilitated and cracking in a base material during sintering and foaming during drawing are prevented.
[Solution] The object is achieved by obtaining a GRIN lens by producing a wet gel from an alcohol solution containing a silicon alkoxide, a dopant alkoxide, and a boron alkoxide as the main ingredients, leaching the same, drying the same to form a dry gel, and sintering and drawing the same.

5 Claims, 1 Drawing Sheet

(56) References Cited

FOREIGN PATENT DOCUMENTS

| JP | 6-122530 | 5/1994 |
|---|---|---|
| JP | 9-202652 | 8/1997 |
| JP | 2005-115097 | 4/2005 |
| JP | 2005-145751 | 6/2005 |
| JP | 4084838 | 2/2008 |
| WO | 2005/047196 | 5/2005 |

OTHER PUBLICATIONS

JP4084838 Machine Translation performed on Japanese Patent Office Website Oct. 19, 2012.*

Japanese Office Action issued May 25, 2012 in corresponding Japanese patent application No. 2008-534213, with English translation.
Korean Office Action issued May 15, 2012 in corresponding Korean patent application No. 10-2010-7027677, with English translation.
Supplementary European Search Report issued Jun. 22, 2012 in corresponding European Application No. 08790746.5.
International Search Report mailed Jul. 29, 2008 in International (PCT) Application No. PCT/JP2008/061833.
Chinese Office Action (with English translation) issued in corresponding Chinese Patent Application No. 200880129630.1.

* cited by examiner

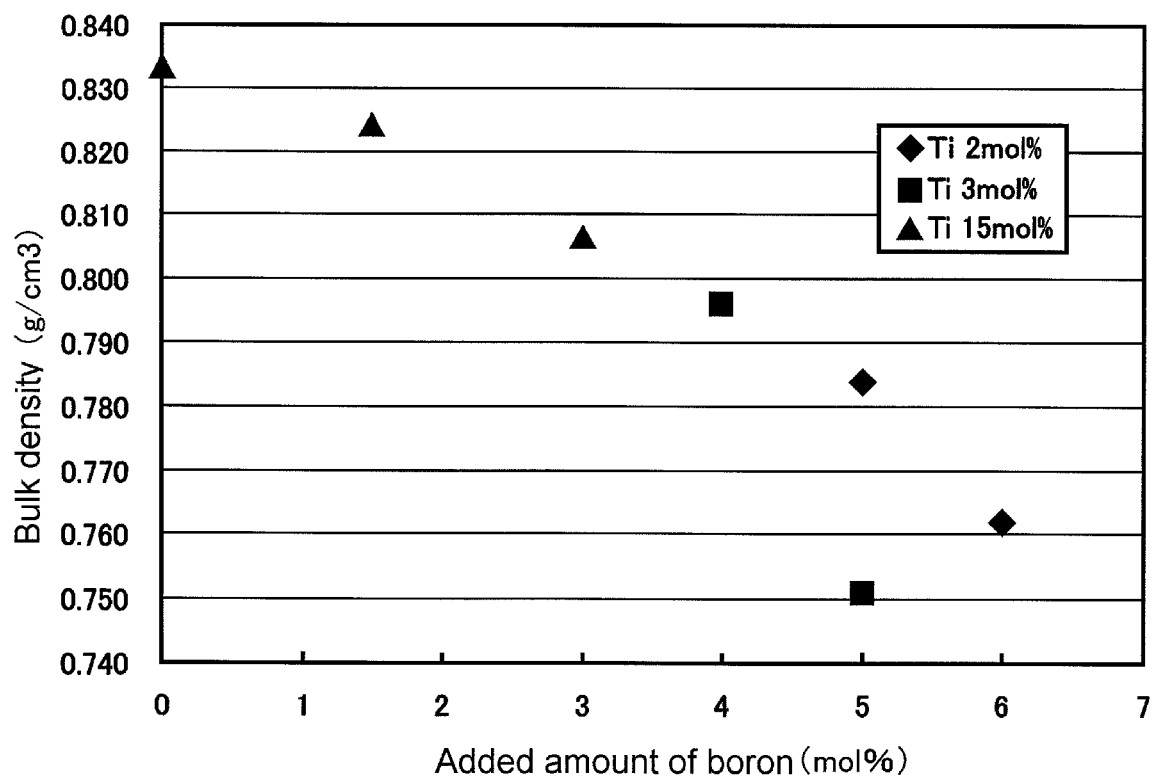

METHOD FOR MANUFACTURING GRIN LENS

TECHNICAL FIELD

The present invention relates to a method for manufacturing a GRIN lens by a sol-gel method.

BACKGROUND ART

An optical fiber collimator having a GRIN lens (Graded Index Lens) fused to the tip end of an optical fiber can connect a semiconductor laser and an optical fiber with high efficiency or provide a connector with few connection loss, for example, and thus is useful as various optical-communication components.

As methods for manufacturing such a GRIN lens, an ion exchange method, a vapor phase CVD method, and the like are mentioned and it is said that a sol-gel method using a low-temperature synthesis method as a base is excellent. A method for manufacturing a GRIN lens by a sol-gel method is disclosed in Patent Documents 1 and 2 described later, for example. The method includes adding an acid or a base as a solvent to an alcohol solution containing a silicon alkoxide ($Si(OR)_4$ (R: alkyl group)) as the main ingredients and hydrolyzing to form a sol, and further subjecting the sol to a polycondensation reaction and maturing to thereby progress a crosslinking reaction to form a wet gel. The production of a GRIN lens requires forming a concentration distribution in a dopant (metal ingredients imparting a refractive-index distribution). The refractive index becomes high in a region where the dopant concentration is high. Thus, the concentration of the central portion of a GRIN lens is made high, so that the concentration becomes lower toward the outside. A method using a metal alkoxide or a metal salt as raw materials of the dopant or a molecule stuffing method is mentioned, and the use of alkoxides of Ti, Ta, Sb, or Zr is particularly useful. In order to form a concentration distribution, leaching is generally performed. In the leaching, a wet gel is immersed in an acid solution, and a dopant around the periphery is eluted to give a concentration distribution. Then, the obtained wet gel is dried to remove the solvent in the gel followed by sintering, thereby producing a dense cylindrical-glass base material to which a refractive index distribution is given. Then, by thinly drawing the glass base material, a GRIN lens is manufactured.

A former sol-gel method includes forming a base material using two ingredients of silicon and a dopant (e.g., $SiO_2$—$TiO_2$ when the dopant is Ti) and has a problem in that foaming is likely to occur during sintering and drawing and the yield becomes poor. The foaming during sintering and drawing greatly relates to the bulk density of a dry gel. More specifically, when the bulk density is high (when the porosity is low), organic materials or moisture contained in the dry gel cannot be completely removed during sintering for producing the base material and cause defects, such as cracking or foaming, due to the heat history during sintering and drawing. Therefore, it is important how the bulk density can be reduced and controlled to a desired level.

Hitherto, an attempt of controlling the bulk density by controlling a chloride concentration, a leaching time, a leaching temperature, or the like during leaching has been made. However, it is impossible to reduce the bulk density while forming a desired refractive-index distribution, in other words, to simultaneously achieve two effects. Thus, a priority is given to imparting a favorable refractive index distribution, which inevitably results in a problem in that the bulk density becomes high.

The following Patent Document 3 has proposed, in order to make the bulk density of a base material small, a technique including producing a wet gel using three ingredients of silicon, a dopant, and aluminum, and eluting the aluminum from the wet gel by leaching to make the bulk density small.

Thus, in the leaching step, almost all the aluminum elutes from the wet gel to increase the porosity. A dry gel obtained by drying the same also has a high porosity. When the dry gel having a high porosity is sintered, the gas in the gel escapes from the pores to the outside, and thus a glass base material in which gas is hardly present is produced. Therefore, cracking due to expansion of the gas in the gel does not occur and foaming does not occur even when the base material is drawn, and thus the yield during sintering and drawing is sharply improved.

[Patent Document 1] Japanese Unexamined Patent Application Publication No. 2005-115097
[Patent Document 2] Japanese Unexamined Patent Application Publication No. 2005-145751
[Patent Document 3] Japanese Patent No. 4084838

DISCLOSURE OF INVENTION

Problems to be Solved by the Invention

In the method described in Patent Document 3 above, when a wet gel is produced from an alcohol solution containing a silicon alkoxide, a dopant alkoxide, and an aluminum alkoxide as the main ingredients, weighing during blending takes a long time in many cases because the viscosity of the aluminum alkoxide is very high and the reactivity is also high. When an operation times exceeds a given time (e.g., 3 minutes) in such a case, the aluminum alkoxides form a gel, and thus a partial nonuniform composition (cluster) is produced, which causes yield deterioration in many cases. The yield is greatly affected by whether or not the operator is skillful in weighing or mixing of the raw materials and, in some cases, 0% yield is not rare. Thus, skilled operators have been indispensable.

It is an object of the present invention to develop a method for manufacturing a GRIN lens in which an operation for preparing a wet gel can be easily and stably carried out, the porosity of a dry gel is high, and cracking during sintering and foaming during drawing are prevented.

Means for Solving the Problems

The present invention is a method for manufacturing a GRIN lens including a step of producing a wet gel from an alcohol solution containing a silicon alkoxide, a dopant alkoxide, and a boron alkoxide as the main ingredients, a step of eluting the dopant and the boron from the outer surface of the wet gel by leaching to give a refractive index distribution, a step of drying the wet gel to produce a dry gel, a step of sintering the dry gel to form a glass base material, and a step of drawing the base material.

Since the viscosity of the boron alkoxide serving as raw materials in the invention is almost equal to that of other raw materials, the boron alkoxide can be easily weighed and the gelling rate is overwhelmingly slow compared with that of a dopant or an aluminum alkoxide. Therefore, there is no necessity of worrying about a strict time limitation when an aluminum alkoxide is used and a wet gel can be easily produced even by an operator who is not particularly skillful. As a result, a high yield can be stably obtained.

In the step of producing a wet gel, the added amount of the boron alkoxide is preferably adjusted so that the concentration of a boron simple substance relative to that of (silicon simple substance+dopant simple substance+boron simple substance) is 1 to 15 mol %.

When the concentration does not reach 1 mol %, the porosity of the dry gel does not become sufficiently high and an effect of suppressing foaming decreases.

When the concentration exceeds 15 mol %, the diameter of fine pores after the boron elutes from the wet gel after leaching becomes excessively large, and thus a process of closing the fine pores by sintering becomes difficult, resulting in a state in which the fine pores are not completely closed. In this state, during bonding between the base material and a quartz rod to be performed as a pretreatment of drawing, turbidity or foaming occurs in the bonding portion, resulting in a state in which drawing cannot be carried out. The addition of an excessive amount of boron increases a time of the following maturing step and reduces gel strength, and thus is not preferable.

The "mol %" used for silicon, a dopant, or boron in the invention refers to the concentration (the number of elements) of these simple substances relative to that of (silicon simple substance+dopant simple substance+boron simple substance).

In the invention, the concentration of the boron remaining in the dry gel after leaching relative to that of (silicon simple substance+dopant simple substance+boron simple substance) is preferably lower than 0.1 mol %.

When a GRIN lens is manufactured from the wet gel to which the boron alkoxide is added, almost all the boron elutes in the leaching step, and thus the porosity becomes high and foaming is suppressed. In the step, the amount of a boron oxide remaining in the GRIN lens is lower than about 0.1 mol % (average) in terms of the boron simple substance. From the viewpoint of imparting a refractive index distribution, the presence of boron is not preferable. Thus, even when the concentration thereof becomes substantially 0 mol %, no problems arise.

In the invention, one or two or more elements selected from Ti, Ta, Sb, and Zr, can be used as the dopant. Such metals are excellent as the dopant of the invention because a performance of increasing the refractive index is excellent, the thermal expansion coefficient is also close to that of quartz glass, and alkoxides thereof easily melt in alcohol. Sb tends to evaporate during sintering of a gel and Zr has a slight instability in a process, such as forming a precipitate although the amount is small, in alcohol as a solvent in the process of producing a wet gel. Thus, Ti and Ta are the most preferable as the dopant.

In the invention, the step of producing a wet gel from an alcohol solution containing a silicon alkoxide, a dopant alkoxide, and a boron alkoxide as the main ingredients is preferably carried out by stirring the alcohol solution containing a silicon alkoxide and a boron alkoxide for 10 to 150 minutes, adding an alcohol solution containing the dopant alkoxide to the above, and further stirring the mixture.

The silicon alkoxide and the boron alkoxide have almost the same viscosity and the reactivity is overwhelmingly low compared with that of the dopant alkoxide. Therefore, it is preferable that the silicon alkoxide and the boron alkoxide be first stirred until a uniform mixture is obtained, and then the dopant alkoxide be added. A stirring time of the silicon alkoxide and the boron alkoxide of 10 minutes or lower is insufficient for obtaining a uniform mixture. When the time is 150 minutes or more, there is a possibility that a reaction progresses due to the two ingredients. Thus, the stirring time needs to be determined in the range above. Considering a general operation environment (temperatures or humidities), the stirring time is more preferably controlled in the range of 30 to 90 minutes.

In a stage where a hydrolysis reaction of the silicon alkoxide and the boron alkoxide slightly progresses, the dopant alkoxide is added. This is because the dopant alkoxide has a high reactivity as described above, and thus when the dopant alkoxide is simultaneously added with the silicon alkoxide or the boron alkoxide, only the dopant first selectively forms a gel, which results in the fact that a glass phase rich in silicon and boron and a glass phase rich in dopant are separately formed.

Advantages

According to the method for manufacturing a GRIN lens of the invention, almost all the boron elutes from the wet gel to increase the porosity in the leaching step, and the dry gel obtained by drying the same also has a high porosity. When the dry gel having a high porosity is sintered, gas in the gel escapes from the pores to the outside, thereby obtaining a glass base material in which gas is hardly present. Therefore, cracking due to expansion of the gas in the gel does not occur, foaming does not occur even when the base material is drawn, and a yield during sintering and drawing is sharply improved.

The viscosity of the boron alkoxide is almost equal to that of other raw materials and the boron alkoxide can be easily weighed and the gelling rate is overwhelmingly low compared with that of the dopant. Therefore, the weighing and blending operation when producing a wet gel can be easily carried out even by an operator who is not particularly skillful. As a result, a GRIN lens can be stably manufactured with a high yield.

BRIEF DESCRIPTION OF DRAWINGS

FIG. 1 is a diagram illustrating the relationship between the added amount of boron and the bulk density of a dry gel.

BEST MODES FOR CARRYING OUT THE INVENTION

Example 1

To a mixed liquid of 42.37 g of tetramethoxysilane (TMOS), 1.15 g of tributylborate ($B(OBu)_3$), 17.05 g of ethanol, and 24.37 g of dimethylformamide (DMF), 5.21 g of 0.54 mol/l hydrochloric acid was added, and then the mixture was stirred for 60 minutes.

DMF is added mainly for leading a fine pore diameter distribution in a dry gel to an appropriate state and is selected as a substance having a dispersibility, a specific gravity, a boiling point, and the like suitable for a solvent. Thus, any substance is used without being limited to the above insofar as the substance brings about equivalent effects. For example, it is considered that EEP (3-ethoxyethyl propionate; boiling point=153° C., specific gravity=0.968) and the like can be used.

The hydrochloric acid is a substance equivalent to a so-called catalyst to be added in order to appropriately perform a hydrolysis reaction and a polycondensation reaction of alkoxide raw materials and other acids (e.g., acetic acid) may be used and, in contrast, alkali (e.g., aqueous ammonia) or the like may be used. However, acids are more excellent in obtaining a proper fine pore diameter distribution in a dry gel.

When the diameter of fine pores produced in this operation cannot be properly controlled, the removal of the contained moisture, organic substances, or the like becomes insufficient in the following sintering step, which causes defects, such as cracking or foaming during drawing.

Thereafter, a mixed liquid of 17.02 g of titanium tetra-n-butoxide (Ti(OBu)$_4$), 22.29 g of ethanol, and 12.18 g of DMF was added, and the mixture was stirred while further gradually adding 19.01 g of ethanol and 19.01 g of pure water, thereby obtaining a wet gel (Example 1) containing 83.5 mol % of silicon, 15 mol % of titanium, and 1.5 mol % of boron.

The gelling progresses due to the hydrolysis reaction and the polycondensation reaction. Thus, the addition rate and the stirring rate of ethanol and pure water need to be determined in order to prevent an excessive reaction. The rates may be determined considering the operation environment, i.e., temperatures, humidities, or the like.

Similarly, a wet gel containing 3 mol % of boron and 15 mol % of titanium (Example 1-2) was produced. Then, the wet gels were matured at 60° C. for 6 days.

Thereafter, the wet gels were immersed in 3 mol/l of hydrochloric acid for 5 hours, leaching was performed by eluting the titanium and the boron from the periphery, and then a concentration distribution of titanium was given to the gels.

Thereafter, the wet gels were dried at 70° C. for 4 days and then at 120° C. for 3 days, thereby obtaining dry gels having a diameter of about 7 mm. The bulk density at this time was about 0.824 (g/cm$^3$) when the added amount of boron was 1.5 mol % and was about 0.807 (g/cm$^3$) when the added amount of boron was 3 mol %. Thus, it was confirmed that the porosity becomes higher in proportion to the added amount of boron.

The obtained dry gels were sintered by increasing the temperature from room temperature to 550° C. at 9° C./hr in an oxygen environment, and then increasing the temperature up to 1250° C. at 7° C./hr in a helium atmosphere, thereby obtaining transparent glass base materials.

The cylindrical glass base materials were drawn into a GRIN lens having a diameter of 125 micron, thereby obtaining colorless and transparent GRIN lenses. When boron was not added, products are not obtained due to foaming. However, the base materials obtained by adding 3 mol % of boron provided products with a yield of 80% or more by suppressing foaming. Even when operators were changed, the yield was confirmed to be 75% or more when boron was added.

The amount (average) of the boron simple substance remaining in the GRIN lens was lower than about 0.05 mol %.

Example 2

To a mixed liquid of 47.19 g of tetramethoxy silane (TMOS), 3.84 g of tributylborate (B(OBu)$_3$), 18.57 g of ethanol, and 24.37 g of dimethylformamide (DMF), 5.86 g of 1.53 mol/l hydrochloric acid was added, and the mixture was stirred for 60 minutes. Thereafter, a mixed liquid of 2.27 g of titanium tetra-n-butoxide (Ti(OBu)$_4$), 21.35 g of ethanol, and 12.18 g of DMF was added, and the mixture was stirred while further gradually adding 18.44 g of ethanol and 18.44 g of pure water, thereby obtaining a wet gel (Example 2) containing 93 mol % of silicon, 2 mol % of titanium, and 5 mol % of boron. Similarly, a wet gel containing 6 mol % of boron and 2 mol % of titanium (Example 2-2) was produced. Then, the wet gels were matured at 60° C. for 6 days.

Thereafter, the wet gels were immersed in 1.53 normal mol/l of hydrochloric acid for 16 hours, leaching was performed by eluting the titanium and the boron from the periphery, and then a concentration distribution of titanium was given to the gels.

Thereafter, the wet gels were dried at 70° C. for 4 days and then at 120° C. for 3 days, thereby obtaining dry gels having a diameter of about 7 mm. The bulk density at this time was about 0.784 (g/cm$^3$) when the added amount of boron was 5 mol % and was about 0.762 (g/cm$^3$) when the added amount of boron was 6 mol %. Thus, it was confirmed that the porosity becomes higher in proportion to the added amount of boron similarly as in Example 1.

The obtained dry gels were sintered by increasing the temperature from room temperature to 550° C. at 9° C./hr in an oxygen environment, and then increasing the temperature up to 1250° C. at 7° C./hr in a helium atmosphere, thereby obtaining transparent glass base materials. In this sintering step, cracking and foaming did not occur in the glass base materials, and the yield was 100%.

The cylindrical glass base materials were drawn into a GRIN lens having a diameter of 125 micron. In the drawing step, foaming was not observed and a transparent GRIN lens was obtained with a yield of 100%.

FIG. 1 illustrates the relationship between the added amount (mol %) of boron and the bulk density (g/cm$^3$) of the dry gel in Examples 1, 1-2, 2, and 2-2. FIG. 1 collectively illustrates the results of compositions of 3 mol % of titanium and the added amount of boron of 4 mol % and 5 mol % and the results of a composition of 15 mol % of titanium and no boron as a Comparative Example. It can be understood from the results that the bulk density becomes small substantially in proportion to an increase in the added amount of boron regardless of the titanium concentration.

Table 1 collectively shows the wet gel composition and the blending ratio of Examples and Comparative Example.

TABLE 1

|  |  | Example 1 | Example 1-1 | Example 2 | Example 2-2 | Comparative Example |
| --- | --- | --- | --- | --- | --- | --- |
| Gel composition (mol %) | Si | 83.5 | 82 | 93 | 92 | 85 |
|  | Ti | 15 | 15 | 2 | 2 | 15 |
|  | B | 1.5 | 3 | 5 | 6 | 0 |
| Blending ratio (g) | Tetramethoxysilane | 42.37 | 41.61 | 47.19 | 46.68 | 43.13 |
|  | Tributylborate | 1.15 | 2.30 | 3.84 | 4.60 |  |
|  | Ethanol | 17.05 | 16.75 | 18.57 | 18.37 | 17.36 |
|  | Dimethylformamide | 24.37 | 24.37 | 24.37 | 24.37 | 24.37 |
|  | Hydrochloric acid | 5.21 (0.54 mol/l) | 5.21 (0.54 mol/l) | 5.86 (1.53 mol/l) | 5.86 (1.53 mol/l) | 5.21 (0.54 mol/l) |
|  | Titanium tetra-n-butoxide | 17.02 | 17.02 | 2.27 | 2.27 | 17.02 |
|  | Ethanol | 22.29 | 22.51 | 21.35 | 21.49 | 22.08 |
|  | Dimethylformamide | 12.18 | 12.18 | 12.18 | 12.18 | 12.18 |

TABLE 1-continued

|  | Example 1 | Example 1-1 | Example 2 | Example 2-2 | Comparative Example |
|---|---|---|---|---|---|
| Pure water | 19.01 | 19.10 | 18.44 | 18.50 | 18.92 |
| Ethanol | 19.01 | 19.10 | 18.44 | 18.50 | 18.92 |

The invention claimed is:

1. A method for manufacturing a GRIN lens, comprising:
a step of producing a wet gel from an alcohol solution containing a silicon alkoxide, a dopant alkoxide, and a boron alkoxide as the main ingredients having a concentration of a boron simple substance of 1 to 15 mol % relative to that of a silicon simple substance, a dopant simple substance, and a boron simple substance;
a step of eluting a dopant simple substance and a boron simple substance from an outer surface of the wet gel by leaching to give a refractive index distribution and to give the wet gel increased porosity by eluting almost all the boron;
a step of drying the wet gel to produce a dry gel having a decreased bulk density equal to or less than 0.830 (g/cm$^3$);
a step of sintering the dry gel to form a glass base material; and
a step of drawing the base material,
wherein the concentration of the boron simple substance remaining in the dry gel after leaching is lower than 0.1 mol % relative to that of a silicon simple substance, the dopant simple substance, and the boron simple substance.

2. The method for manufacturing a GRIN lens according to claim 1, wherein the dopant alkoxide is one or more alkoxide(s) of Ti, Ta, Sb, or Zr.

3. The method for manufacturing a GRIN lens according to claim 2, wherein the step of producing a wet gel from an alcohol solution containing a silicon alkoxide, a dopant alkoxide, and a boron alkoxide as the main ingredients comprises stirring an alcohol solution containing a silicon alkoxide and a boron alkoxide for 10 to 150 minutes, adding an alcohol solution containing a dopant alkoxide to the stirred alcohol solution thereby producing a mixture, and further stirring the mixture.

4. The method for manufacturing a GRIN lens according to claim 1, wherein the step of producing a wet gel from an alcohol solution containing a silicon alkoxide, a dopant alkoxide, and a boron alkoxide as the main ingredients comprises stirring an alcohol solution containing a silicon alkoxide and a boron alkoxide for 10 to 150 minutes, adding an alcohol solution containing a dopant alkoxide to the stirred alcohol solution thereby producing a mixture, and further stirring the mixture.

5. The method for manufacturing a GRIN lens according to claim 1, wherein the step of drying the wet gel to produce a dry gel produces a dry gel with a bulk density bulk density between 0.750 and 0.830 (g/cm$^3$).

* * * * *